(12) United States Patent
Satoh

(10) Patent No.: US 6,709,501 B2
(45) Date of Patent: Mar. 23, 2004

(54) BAKED COLOR PENCIL LEAD AND PROCESS FOR PRODUCING THE SAME

(75) Inventor: Atsushi Satoh, Gunma (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/153,594

(22) Filed: May 24, 2002

(65) Prior Publication Data

US 2003/0000420 A1 Jan. 2, 2003

(30) Foreign Application Priority Data

May 25, 2001 (JP) ........................................ 2001-156746

(51) Int. Cl.[7] .............................................. C09D 13/00
(52) U.S. Cl. ............................. 106/31.11; 106/287.12; 106/287.13; 106/287.14
(58) Field of Search ........................ 106/31.11, 287.12, 106/287.13, 287.14

(56) References Cited

U.S. PATENT DOCUMENTS 5,595,589 A * 1/1997 Hoshiba et al. ........... 106/31.11
5,645,629 A * 7/1997 Kitazawa et al. ......... 106/31.11

FOREIGN PATENT DOCUMENTS

| JP | A-8-48931 | 2/1996 |
| JP | A-9-67540 | 3/1997 |
| JP | A-11-343445 | 12/1999 |
| JP | A-2000-17221 | 1/2000 |
| JP | A-2000-119582 | 4/2000 |

* cited by examiner

Primary Examiner—C. Melissa Koslow
Assistant Examiner—Veronica F. Faison
(74) Attorney, Agent, or Firm—Burns, Doane, Swecker & Mathis, LLP

(57) ABSTRACT

Provided is a baked color pencil lead which comprises a baked lead obtained by impregnating pores of a porous baked lead comprising at least a filler with a solution containing a polysiloxane having a structural unit represented by the following Formula (I) and subjecting it to heat treatment in an oxidation atmosphere and/or a non-oxidation atmosphere and a colorant filled into the pores of the resultant baked lead and which is excellent in mechanical strength (bending strength, tensile strength, impact strength and the like) while exhibiting a satisfactory coloring power and sufficient drawn line density:

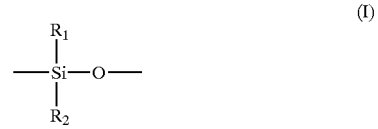

(I)

wherein $R_1$ and $R_2$ each represent an alkyl group, an alkoxy group, a hydroxy group or a siloxane group, and they may be the same or different.

3 Claims, No Drawings

BAKED COLOR PENCIL LEAD AND PROCESS FOR PRODUCING THE SAME

BACKGROUND OF THE INVENTION

1. Field of the Invention

The present invention relates to a baked color pencil lead which is excellent in mechanical strength (bending strength, tensile strength, impact strength and the like) while exhibiting a satisfactory coloring power and sufficient drawn line density and a process for producing the same, particularly to a baked color pencil lead which is suited to a color pencil lead for a mechanical pencil and a wood case pencil and to a process for producing the same.

2. Description of the Related Art

In a conventional baked color pencil lead, clay and the like are used as a binder, and a filler such as boron nitride and, if necessary, a heat resistant pigment and a reaction-accelerating agent are added thereto to prepare a blend composition. The blend composition is kneaded and extruded, and then it is subjected to heat treatment to obtain a porous baked lead. Pores of this lead are filled with an ink comprising a dye and a pigment to prepare a color pencil lead, which has been a leading color pencil lead.

Important characteristics usually required for a color pencil lead are high mechanical strength, a good coloring power of drawn lines and strong density of drawn lines, but in the baked color pencil lead described above, mechanical strength is not sufficiently high, and strong drawn line density and a good coloring power are not obtained. Accordingly, desired is a color pencil lead in which the lead has large porosity so that a sufficiently large amount of a colorant can be contained and which has sufficiently high mechanical strength.

Known as a method for solving these problems is a baked color pencil lead prepared by impregnating pores of a baked lead comprising at least a filler with a perhydropolysilazane solution to form silicon nitride as a binder by heat treatment in an inert atmosphere and filling pores of the lead with an ink, and a process for producing the same (Japanese Patent Application Laid-Open No. 48931/1996 filed by the present applicants).

Further, a process for producing a baked color pencil lead comprising the steps of baking a lead at 1000° C. or higher to form silicon nitride in the lead and then subjecting it to heat treatment at 600° C. or higher in an oxidation atmosphere is known as a method of solving a problem on darkening of a baked lead and a low chroma thereof which are caused by carbonization of a trace amount of an organic solvent remained in the lead (Japanese Patent Application Laid-Open No. 119582/2000 filed by the present applicants).

Baked color pencil leads obtained by the methods disclosed in these respective prior applications are excellent in mechanical strength while exhibiting a satisfactory coloring power and sufficient drawn line density which have so far never been seen, but there are a few problems in that once silicon nitride is formed, a compound in which a carbon atom chemically combined with a silicon atom and residual carbon covered with silicon nitride can not completely be removed even by subsequent baking in an oxidation atmosphere, which causes darkening in lines drawn by a baked color pencil lead for a light color.

Further, provided as a baked color pencil lead having high chroma by the present applicants are a baked color pencil lead prepared by impregnating pores of a baked lead comprising at least a filler with a polysilazanes-containing solution, subjecting it to heat treatment in the air to thereby form silicon oxide as a binder and filling pores of the lead with an ink, and a process for producing the same (Japanese Patent Application Laid-Open No. 17221/2000).

However, when silicon oxide is formed as a binder by the method described above, pores formed after baking have a small diameter and a small pore volume, and therefore there is a problem in that writing performance is a little hard and such a lead is not equal to a silicon nitride lead in coloring power.

On the other hand, known are a baked color pencil lead using as a binder, a compound obtained by heating at least one selected from the group consisting of organozirconium compounds and organoaluminum compounds (Japanese Patent Application Laid-Open No. 67540/1997) and a baked color pencil lead prepared by impregnating pores of a baked lead comprising at least a filler with a solution of at least one selected from the group consisting of metal chelates, metal carboxylates and metal alkoxides, subjecting the lead to heat treatment to thereby form metal oxide as a binder and filling pores of the lead with an ink, and a process for producing the same (Japanese Patent Application Laid-Open No. 343445/1999).

However, when using the organic compounds and the metal chelates disclosed in the respective prior applications described above, there are the problems in that it is difficult to control reaction in kneading, extruding and impregnating into pores and that unevenness is caused to a solution concentration and a viscosity in the course of impregnation, so that strength and hardness of the baked lead are liable to be dispersed.

In light of the conventional problems described above, an object of the present invention is to further improve the above-mentioned prior arts disclosed by the present inventors and to provide a baked color pencil lead having markedly excellent mechanical strength, particularly a vivid and excellent coloring power and smooth writing performance while using silicon oxide as a binder, and a process for producing the same.

SUMMARY OF THE INVENTION

Intensive researches repeated by the present inventors in order to solve the conventional problems described above have resulted in finding that the problems described above can be solved by impregnating pores of a porous baked lead comprising at least a filler with a solution containing a polysiloxane having a specific structural unit and subjecting it to heat treatment in an oxidation atmosphere and/or a non-oxidation atmosphere, and thus the present invention has come to be completed.

That is, the baked color pencil lead of the present invention and a process for producing the same comprise the following items (1) to (3).

(1) A baked color pencil lead comprising a baked lead obtained by impregnating pores of a porous baked lead comprising at least a filler with a solution containing a polysiloxane having a structural unit represented by the following Formula (I) and subjecting it to heat treatment and a colorant filled into pores of the resultant baked lead:

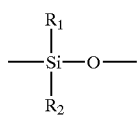

(I)

wherein $R_1$ and $R_2$ each represent an alkyl group, an alkoxy group, a hydroxy group or a siloxane group, and they may be the same or different.

(2) The baked color pencil lead as described in the above item (1), wherein the porous baked lead comprising a filler described above is a porous baked lead obtained by kneading and extruding a blend composition comprising at least a filler and an organic excipient, baking it in a non-oxidation atmosphere to obtain a first baked lead and further heating the first baked lead in an oxidation atmosphere to remove a carbon content by oxidation.

(3) A process for producing a baked color pencil lead comprising the steps of:

kneading and extruding a blend composition comprising at least a filler and an organic excipient and then baking it in a non-oxidation atmosphere to obtain a first baked lead, further heating the above first baked lead in an oxidation atmosphere to remove a carbon content by oxidation to obtain a second baked lead, impregnating pores of the above second baked lead with a solution containing a polysiloxane having a structural unit represented by the following Formula (I) and subjecting it to heat treatment in an oxidation atmosphere and/or a non-oxidation atmosphere to thereby obtain a third baked lead, and filling pores of the above third baked lead with a colorant:

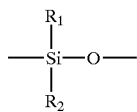

(I)

wherein $R_1$ and $R_2$ each represent an alkyl group, an alkoxy group, a hydroxy group or a siloxane group, and they may be the same or different.

According to the present invention, provided are a baked color pencil lead in which silicon oxide is uniformly present in the whole part of the baked lead and therefore the strength is high and which has a good writing performance and provides a very vivid drawn line color, and a process for producing the same. In particular, it is suited to a color pencil lead for a mechanical pencil and a wood case pencil.

DETAILED DESCRIPTION OF THE PREFERED EMBODIMENTS

The embodiment of the present invention shall be explained below in details.

The baked color pencil lead of the present invention comprises a baked lead obtained by impregnating pores of a porous baked lead comprising at least a filler with a solution containing a polysiloxane having a structural unit represented by the following Formula (I) and subjecting it to heat treatment and a colorant filled into the pores of the resultant baked lead:

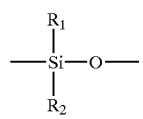

(I)

wherein $R_1$ and $R_2$ each represent an alkyl group, an alkoxy group, a hydroxy group or a siloxane group, and they may be the same or different.

The porous baked lead described above used for the present invention is provided in the form of a porous baked lead having open pores prepared by kneading a filler, extruding into fine lines and baking them.

The filler used for the porous baked lead described above shall not specifically be restricted as long as it has so far been used for a baked color pencil lead, and any ones can be used. Capable of being used are, for example, white fillers such as boron nitride, talc, mica and calcium carbonate and, depending on a hue of a color pencil, colored materials such as molybdenum disulfide, and it is a matter of course that a mixture of several kinds thereof can be used as well.

Boron nitride is particularly preferred in terms of physical properties and a shape thereof. Further, a heat resistant pigment may be blended, if necessary.

The porous baked lead described above is obtained by kneading and extruding a blend composition comprising the filler described above and an organic excipient and baking it.

Capable of being used as the organic excipient described above is any one of, for example, thermoplastic resins such as polyvinyl chloride resins, chlorinated polyvinyl chloride resins and polyvinyl alcohol, thermosetting resins such as furan resins, phenol resins and epoxy resins, natural high molecular substances such as lignin, cellulose and traga- canth gum and pitches such as petroleum asphalt, coal tar pitch, naphtha-cracked pitch and carbonization pitches of synthetic resins, and it is a matter of course that a mixture of several kinds thereof can be used as well.

Further, at least one selected from solvents or plasticizers for the organic excipient such as water, dioctyl phthalate (DOP), dibutyl phthalate (DBP), tricresyl phosphate (TCP), dioctyl adipate (DOA), propylene carbonate, alcohols, ketones and esters can be added, if necessary, to the blend composition described above for the purpose of improving characteristics in kneading carried out by applying high shearing force and characteristics in extruding.

In the baked color pencil lead according to the present invention, the porous baked lead comprising at least the filler described above is particularly preferably the second baked lead made by kneading and extruding the blend composition comprising the filler and the organic excipient each described above, in which the filler can be highly oriented and which can provide enough pores, then baking it in a non-oxidation atmosphere to carbonize the above organic substance to thereby obtain the first baked lead and further heating the first baked lead in an oxidation atmosphere to remove the above carbon content by oxidation.

In the present invention, the blend composition described above which is a material for the porous baked lead is sufficiently kneaded by means of a Henschel mixer, a pressure kneader or a two-roll mill and then extruded into fine lines by means of an extruder, and they are then baked in a non-oxidation atmosphere of inert gas such as nitrogen gas and argon gas, whereby obtained is the first baked lead in which a carbon content obtained by carbonizing the organic excipient is used as a binder. In this case, the baking temperature and baking atmosphere have to be noted so that no alteration is caused to the filler. For example, when talc is used as the filler, the crystal form is changed if the baking temperature exceeds 700° C., and therefore it is preferably baked at 700° C. or lower.

The second baked lead can be obtained by heating the first baked lead obtained above in an oxidation atmosphere to thereby remove a carbon content of the binder by oxidation.

In the present invention, the second baked lead obtained above is impregnated with a solution containing a polysiloxane having the structural unit represented by Formula (I) described above and subjected it to heat treatment in an oxidation atmosphere and/or a non-oxidation atmosphere, whereby silicon oxide is formed in the porous baked lead comprising at least the filler described above by the reaction by which the polysiloxane having the structural unit represented by Formula (I) described above is converted into silicon oxide. This provides a baked lead (third baked lead) in which silicon oxide is uniformly present as the binder component in the lead.

Any one can be used as the polysiloxane having the structural unit represented by Formula (I) described above in the present invention as long as it can form silicon oxide in the porous baked lead comprising at least the filler. Accordingly, a carbon number of a functional group thereof and a polymerization degree thereof shall not specifically be restricted as long as a polysiloxane can finally form silicon oxide in the porous baked lead described above.

The polysiloxane having the structural unit represented by Formula (I) described above in the present invention can be synthesized by, for example, a conventional polymerization method such as a sol-gel method using an organic silicon compound or an inorganic silicon compound as a starting material.

The organic silicon compound and the inorganic silicon compound described above, which are the starting material, can be used alone or in combination of two or more kinds thereof, and are selected from those which are suitable for obtaining the polysiloxane having the structural unit represented by Formula (I) described above by polymerization. Among them, tetraethoxysilane is preferred because of inexpensiveness and easiness in handling.

It is enough that a polymerization degree of the polysiloxane used in the present invention is 2 (n=2) or more and it shall not specifically have an upper limit, and it is suitably determined in terms of easiness in polymerization reaction and handling of the resultant polysiloxane.

The polysiloxane having the structural unit represented by Formula (I) described above can suitably be dissolved for use in an organic solvent to obtain a solution having such a viscosity as allowing the solution to be impregnable, which depends on a polymerization degree thereof.

The organic solvent for dissolving the polysiloxane used in the present invention includes, for example, alcohols such as methanol, ethanol, propanol and butanol and organic solvents such as ethylene oxide, ethylene glycol, tetraethylene glycol, toluene, xylene, methyl ethyl ketone and THF, and they may be used alone or in combination of two or more kinds thereof.

Two or more kinds of the polysiloxane-containing solutions described above can be used without being limited to only one kind.

The second baked lead, that is, the porous baked lead comprising at least the filler can be impregnated with the solution containing the polysiloxane having the structural unit represented by Formula (I) described above by, for example, a method in which it is dipped in the solution and impregnated therewith under a condition of heating, reducing pressure or applying pressure.

Heat treatment to be subjected after impregnating the second baked lead with the solution containing the polysiloxane having the structural unit represented by Formula (I) described above is carried out in an oxidation atmosphere and/or a non-oxidation atmosphere. In an oxidation atmosphere, it is carried out preferably at 350° C. or higher and 850° C. or lower, and in a non-oxidation atmosphere, it is carried out preferably at 700° C. or higher.

If the heat treatment is carried out at a low temperature of lower than 350° C. in an oxidation atmosphere or at a low temperature of lower than 700° C. in a non-oxidation atmosphere, polysiloxane is not sufficiently oxidized or the respective functional groups represented by $R_1$ and $R_2$ in Formula (I) described above are not sufficiently eliminated and the strength to be brought about by silicon oxide which is the binder can not sufficiently be exhibited. On the other hand, if the heat treatment is carried out at a temperature exceeding 850° C. in an oxidation atmosphere, the filler is oxidized or deteriorated, so that the lead is less liable to be abraded or reduced in mechanical strength. Accordingly, both temperature ranges are not preferred.

Particularly preferably, the heat treatment is carried out at a temperature of 850° C. or lower in an oxidation atmosphere, and subsequently is further carried out at a temperature of 1000° C. or higher in a non-oxidation atmosphere. Baking at 1000° C. or higher makes the baked lead less liable to cause hygroscopic degradation.

Further, ambient air may be used in the oxidation atmosphere, but in order to elevate the removing efficiency, oxygen may be mixed or 100% of oxygen may be used. However, boron nitride is liable to be oxidized if heated at a high temperature in a moist state, and therefore the atmosphere is preferably sufficiently dried.

In the present invention, the second baked lead which is impregnated with the solution containing the polysiloxane having the structural unit represented by Formula (I) described above is baked to thereby obtain a baked lead (third baked lead) in which silicon oxide is formed in the lead. Further, the impregnating step of the solution and the baking step each described above may be repeated, if necessary, in order to obtain the baked lead having higher strength.

In the present invention, the polysiloxane having the structural unit represented by Formula (I) described above has a sufficiently firm siloxane skeleton at a stage before baking and can form silicon oxide which is very minute and has less defects unlike silicon oxide produced by baking perhydropolysilazane, and therefore the sufficiently high strength can be exhibited without reducing a pore volume produced in the third baked lead.

The baked color pencil lead of the present invention is completed by filling pores of the third baked lead obtained above with a colorant such as an ink by impregnating treatment.

Any ink can be used as the ink as long as inks are conventionally known for color pencils. Used are, for example, printing inks, stamp inks, ballpoint pen inks and water based inks for a writing instrument each usually used, which are produced by dissolving or dispersing a colorant such as a dye and a pigment in water, animal and vegetable oils, synthetic oils, alcohols and hydrocarbons and if necessary, further adding resins and surfactants.

In addition thereto, a solution containing a pigment precursor is impregnated into the lead to be converted into a pigment in open pores by reaction, whereby the lead can be filled with the pigment and colored.

Impregnation thereof can be carried out under a condition of heating, reducing pressure or applying pressure. Further, it is possible to repeat these steps to increase the color density or to color the lead by plural coloring methods. It is further possible as well to impregnate the remaining open pores with oil to improve the lubricity in writing.

In the baked color pencil lead thus constituted and the process for producing the same, the porous baked lead comprising at least the filler is impregnated in pores thereof with the solution containing the polysiloxane having the structural unit represented by Formula (I) described above and subjected to heat treatment in an oxidation atmosphere and/or a non-oxidation atmosphere, whereby the baked lead having high strength in which silicon oxide is uniformly present as the binder in the porous baked lead can be obtained. This baked lead filled with a colorant has smooth writing performance and very vivid chroma.

EXAMPLES

Next, the present invention shall more specifically be explained with reference to examples and comparative examples, but the present invention shall by no means be restricted by the examples described below. In the following examples, "part" means part by weight.

Example 1

| Blend composition A: | |
|---|---|
| Tetraethoxysilane | 35.0 parts |
| Ethanol | 16.0 parts |
| 6N hydrochloric acid | 0.6 part |
| Purified water | 4.7 parts |

The blend composition A having the formation described above was stirred at 80° C. for 5 hours while passing nitrogen gas to react them, and then ethanol was further added thereto to control the viscosity so that the solution has an impregnable viscosity, whereby polysiloxane solution A was prepared.

| Blend composition B: | |
|---|---|
| Boron nitride | 41.3 parts |
| Vinyl chloride resin | 41.3 parts |
| Dioctyl phthalate (DOP) | 16.5 parts |
| Zinc stearate | 0.9 part |

The blend composition B described above was mixed and dispersed by means of a Henschel mixer and kneaded by means of a pressure kneader and a two-roll mill. Then, it was extruded into fine lines, and they were subjected to heat treatment at 180° C. in the air in order to remove the residual plasticizer from them and then heated up to 1000° C. in a nitrogen atmosphere, followed by baking at 1000° C., whereby a first baked lead was obtained.

This first baked lead was heated up to 700° C. in an oxidation atmosphere and baked with heating at 700° C. to remove the remaining carbonized resin, whereby a white second baked lead was obtained.

This second baked lead was impregnated with polysiloxane solution A described above at a room temperature for a day, and it was then heated up to 700° C. in an oxidation atmosphere and baked at 700° C. Then, it was further heated up to 900° C. in a nitrogen atmosphere and baked at 900° C., whereby a white third baked lead having a diameter of 0.712 mm was obtained.

Next, the third baked lead described above was dipped in a fluorescent yellow ink and left standing at 70° C. for 24 hours. The surface of this third baked lead filled with the fluorescent yellow ink was washed with alcohol to obtain a fluorescent yellow baked color pencil lead.

Example 2

| Blend composition C: | |
|---|---|
| Tetramethoxysilane | 48.0 parts |
| Methanol | 42.1 parts |
| 2% hydrochloric acid | 0.6 part |
| Purified water | 11.9 parts |

The blend composition C having the formation described above was stirred at 35° C. for 12 hours in a nitrogen atmosphere to react them, and 2 parts of methyltrimethoxysilane was further added and stirred for one hour. Then, methanol was added thereto to control the viscosity so that the solution has an impregnable viscosity, whereby polysiloxane solution C was prepared.

Next, the same second baked lead as in Example 1 described above was prepared, and then this second baked lead was impregnated with polysiloxane solution C prepared above at a room temperature for a day, followed by heating up to 700° C. in an oxidation atmosphere to bake at 700° C. Then, it was further heated up to 1000° C. in a nitrogen atmosphere and baked at 1000° C., whereby a white third baked lead having a diameter of 0.710 mm was obtained.

Next, the third baked lead described above was dipped in a fluorescent yellow ink in the same manner as in Example 1 to thereby obtain a fluorescent yellow baked color pencil lead.

Comparative Example 1

The same second baked lead as in Example 1 described above was prepared and then impregnated with a perhydropolysilazane-containing solution under the same conditions as in Example 1, and it was heated up to 600° C. in a nitrogen atmosphere and baked at 600° C. to obtain a baked lead. Then, this baked lead was impregnated once again with the perhydropolysilazane-containing solution, and it was heated up to 1250° C. in a nitrogen atmosphere and baked at 1250° C. It was then cooled down to 700° C. and baked at 700° C. in the air to obtain a white baked lead having a diameter of 0.711 mm.

Further, the baked lead described above was dipped in a fluorescent yellow ink in the same manner as in Example 1 described above to thereby obtain a fluorescent yellow baked color pencil lead.

Comparative Example 2

The same second baked lead as in Example 1 described above was prepared and then impregnated with a perhydropolysilazane-containing solution under the same conditions as in Example 1, and it was heated up to 600° C. in the air and baked at 600° C. to obtain a baked lead. Next, the baked lead was impregnated once again with the perhydropolysilazane-containing solution, and it was heated up to 700° C. in the air and baked at 700° C. to obtain a white baked lead having a diameter of 0.705 mm.

Further, the baked lead described above was dipped in a fluorescent yellow ink in the same manner as in Example 1 described above to thereby obtain a fluorescent yellow baked color pencil lead.

Comparative Example 3

The same second baked lead as in Example 1 described above was prepared and then impregnated with a perhydropolysilazane-containing solution under the same conditions as in Example 1, and it was heated up to 1250° C. in a nitrogen atmosphere and baked at 1250° C. It was then cooled down to 700° C. and baked at 700° C. in an oxidation atmosphere, and it was cooled down to a room temperature. Further, the baked lead was impregnated with polysiloxane solution A at a room temperature for a day, and it was then heated up to 700° C. in an oxidation atmosphere and baked at 700° C. It was further heated up to 900° C. in a nitrogen atmosphere and baked at 900° C., whereby a white baked lead having a diameter of 0.717 mm was obtained.

Further, the baked lead described above was dipped in a fluorescent yellow ink in the same manner as in Example 1 described above to thereby obtain a fluorescent yellow baked color pencil lead.

Evaluated were an appearance and a drawn line color of the baked leads before dying with the ink which were obtained in Examples 1 to 2 and Comparative Examples 1 to 3, and further for the fluorescent yellow baked color pencil leads evaluated were bending strength (MPa) according to JIS-S-6005-1992, writing performance by sensory evaluation and a drawn line color. The results thereof are shown in the following Table 1.

TABLE 1

|  | Appearance and drawn line color of baked lead before dying | Bending Strength (MPa) | Writing performance | Coloring of drawn line |
|---|---|---|---|---|
| Example 1 | Very white | 242.3 | Good | Clear |
| Example 2 | Very white | 241.0 | Good | Clear |
| Comparative Example 1 | A little gray | 235.0 | Good | Darkened |
| Comparative Example 2 | Very white | 220.6 | Slightly hard | Clear but a little light |
| Comparative Example 3 | Slightly gray | 240.5 | Good | Slightly darkened |

As apparent from the results shown in Table 1 described above, it has been found that in the baked color pencil leads obtained in Examples 1 and 2 falling in the scope of the present invention, the baked leads before dying have a very white appearance and provide a very white drawn line color without damaging the bending strength and the writing performance and that the baked leads after dying have a very good coloring power and provides a vivid and deep drawn line color.

On the other hand, in Comparative Examples 1 and 3 falling outside the scope of the present invention, darkening is observed in an appearance and a drawn line color of the baked leads before dying, and when the pores were filled with a fluorescent yellow ink to prepare a fluorescent yellow baked color pencil lead to observe coloring of lines drawn with the baked color pencil leads, an effect exerted by a gray color provided by carbon and the like which were introduced into the lead in producing silicon nitride made the drawn line color darkened yellow and weakened fluorescence. It has been found that the degree of darkening is in order of (Examples 1 and 2)=(Comparative Example 2)<(Comparative Example 3)<(Comparative Example 1) and that this exerts an effect on a coloring power of the drawn lines.

Further, it has been confirmed that in Comparative Example 2, the baked lead before dying has a very white appearance and provides a very white drawn line color, but the writing performance is hard because of a small pore volume of the baked lead and that lines drawn with the baked lead after dying are light in the color since it can not be filled with a sufficiently large amount of the colorant.

What is claimed is:

1. A baked color pencil lead comprising a baked lead obtained by impregnating pores of a porous baked lead comprising at least a filler with a solution containing a polysiloxane having a structural unit represented by the following Formula (I) and subjecting it to heat treatment and a colorant filled into the pores of the resultant baked lead:

wherein $R_1$ and $R_2$ each represent an alkyl group, an alkoxy group, a hydroxy group or a siloxane group, and they may be the same or different.

2. The baked color pencil lead as described in claim 1, wherein the porous baked lead comprising a filler is a porous baked lead obtained by kneading and extruding a blend composition comprising at least a filler and an organic excipient, baking it in a non-oxidation atmosphere to obtain a first baked lead and further heating the first baked lead in an oxidation atmosphere to remove a carbon content by oxidation.

3. A process for producing a baked color pencil lead comprising the steps of:

kneading and extruding a blend composition comprising at least a filler and an organic excipient and then baking it in a non-oxidation atmosphere to obtain a first baked lead, further heating said first baked lead in an oxidation atmosphere to remove a carbon content by oxidation to obtain a second baked lead, impregnating pores of said second baked lead with a solution containing a polysiloxane having a structural unit represented by the following Formula (I) and subjecting it to heat treatment in an oxidation atmosphere and/or a non-oxidation atmosphere to thereby obtain a third baked lead, and filling pores of said third baked lead with a colorant:

wherein $R_1$ and $R_2$ each represent an alkyl group, an alkoxy group, a hydroxy group or a siloxane group, and they may be the same or different.

* * * * *